E. T. Covell,
Soldering Machine.
No. 99,410.          Patented Feb. 1, 1870.
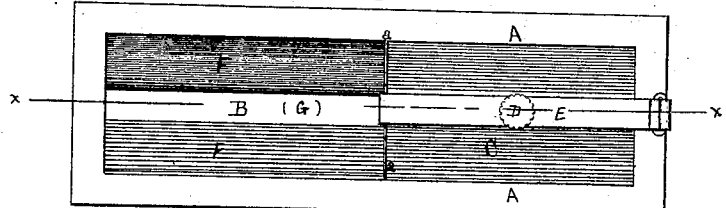
Fig. 1.
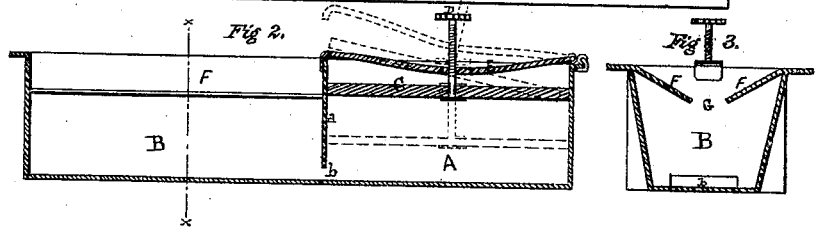 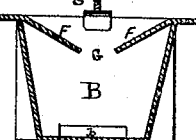
Fig. 2.     Fig. 3.
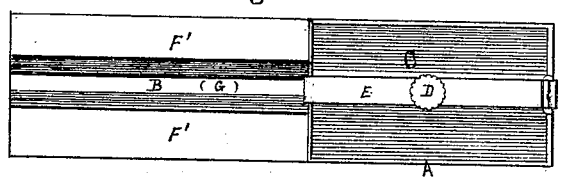 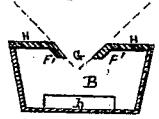
Fig. 4.     Fig. 5.
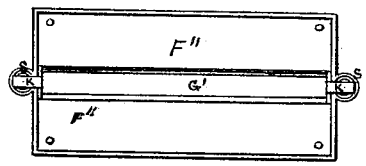 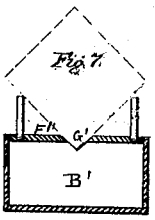
Fig. 6.     Fig. 7.
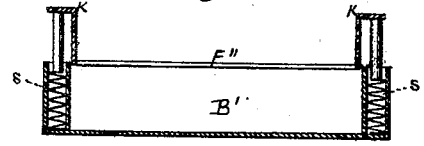
Fig. 8.
Witnesses.          Inventor.
F. W. Howard         Edward T. Covell
C. C. Wilson          By David A. Burr
                             Atty.

United States Patent Office.

E. T. COVELL, OF BROOKLYN, NEW YORK.

Letters Patent No. 99,410, dated February 1, 1870.

IMPROVEMENT IN SOLDERING-MACHINES.

The Schedule referred to in these Letters Patent and making part of the same.

I, E. T. COVELL, of Brooklyn, county of Kings, and State of New York, have invented certain Improvements in Soldering-Machines, of which the following is a specification.

My invention relates to the construction of improved forms of apparatus for soldering simultaneously the entire length of the ordinary side corner-seam of a metallic vessel, by first suspending the same over a bath of molten solder, in such manner as that it shall rest in a plane parallel, or but slightly inclined to the surface of the molten solder, and then immersing or dipping the entire length of the seam in the solder, either by producing an upward movement or flow of the solder until the seam is reached, (the supports upon which the whole rests being fixed and stationary,) or by a movement of said supports toward the solder.

The first part of my said invention relates to the combination, with any form of soldering-pan containing molten solder, of a plate, either fixed or movable, having an elongated slot or aperture therein, or of two bars or plates, so arranged as to leave an open interval between them, the elongated slot or open interval being of such width as to permit the corner-seam of a vessel placed thereon, to project through the same far enough to reach the surface of the molten solder in the pan, and there sustain it.

The second part of my invention relates to the combination of a separate reservoir for molten solder, with a pan or vessel in which a portion of the solder is exposed, to receive the joints of metallic vessels, to be coated and soldered by being dipped therein, said reservoir being provided with a piston or plunger, operated by a screw, or with any equivalent device whereby the quantity of molten solder in the soldering-pan may be increased or diminished, and its surface raised, lowered, and adjusted at pleasure.

The object of this part of my invention is to obviate the necessity of moving the supports upon which the metallic vessel, whose joints are to be soldered by immersion, rests, and to afford a ready means of adjusting the depth of the solder, with relation to suitable fixed supports for the vessel.

In the accompanying drawings—

Figure 1 is a plan view of my improved soldering-apparatus, with supply-reservoir and dipping-pan combined;

Figure 2, a central vertical longitudinal section in line $x\ x$ of fig. 1, in which the movements of the plunger, and of the cross-bar sustaining it, are illustrated by dotted lines;

Figure 3, a transverse section in line $x\ x$ of fig. 2.

Figure 4, a plan view of my apparatus, showing a modification in the form of the supporting-plate on the dipping-pan, more fully illustrated by a transverse section thereof in Figure 5;

Figure 6, a plan view of a dipping-pan without reservoir, having a movable supporting-plate combined therewith;

Figure 7, a vertical transverse section; and

Figure 8, a vertical longitudinal section of the same, the manner of placing thereon a vessel to be soldered being illustrated by dotted lines in fig. 7.

A is the supply-reservoir, and B, the dipping-pan of my apparatus. These are separated by the partition or division-plate $a$, which is provided with an aperture, $b$, (figs. 2, 3, and 5,) at the bottom thereof, forming the only communication between the two.

The relative proportions and arrangement of the dipping-pan B and its supply-reservoir A may be varied, it being only necessary that a proper communication between the two, to permit a flow and reflow of solder from the one to the other, shall be established.

C is a plunger or piston-plate, fitting closely, and moving vertically within the reservoir A.

It is supported and raised or lowered by a thumb-screw, D, which works through a nut or threaded aperture in the cross-bar E, and is secured to the plunger by a loose joint.

The bar E is hinged at one end to the upper edge of the reservoir A, and, extending across the same, rests upon, hooks over, and is fastened to the opposite edge thereof.

By means of this hinged connection of the supporting-bar E to the reservoir, the plunger can be easily lifted out of the reservoir, in order to fill it, without detachment therefrom, as illustrated by the dotted lines in fig. 2.

F F (figs. 2 and 3) are inclined plates, fixed over the dipping-pan or vessel B, upon each side thereof, so as to leave an elongated slot or open space, G, between them, extending the entire length of the pan, more or less. This extended opening is of such width as to permit the angle or corner formed by the two sides, or at the top or bottom of a can or other vessel, to project through a short distance.

The plates F F, or their edges along the opening G, will serve to support the can, whose angle, edge, or corner-seam is inserted between them. (See dotted lines, figs. 5 and 7.)

F' F' (figs. 4 and 5) are inclined plates, in combination with a horizontal lid or cover, H, upon a dipping-pan, B.

F'' is a single plate or cover for the dipping-pan B', having an elongated slot, G', formed therein.

The slotted plate F'' is made to fit within the pan or vessel B', and is provided, at either end, with projecting arms K K, resting upon springs S S, which support it in the upper part of the pan.

It is forced down, at pleasure, to the level of the molten solder in the pan, by means of pressure exerted thereon, either directly, by hand, or otherwise, by means of treadles, or other devices not illustrated.

In operation, the reservoir and pan A B, or the pan B', are placed over a suitable furnace, and filled or partially filled with solder. The depth of molten solder in the pan B is then properly regulated, by turning the thumb-screw D, which, by forcing down the plunger C in the reservoir A, will cause the solder therein to flow, through the aperture $b$, into said pan B, or, by raising the plunger, will cause a reflow thereof out of said pan.

When the depth of solder is properly regulated, in relation to the opening G between the plates F F, the seam at the angle of the can or vessel is inserted through said opening G, until the vessel rests upon the edges of the plates F F, and is immersed, to a proper depth, in the molten solder below. The can or vessel is then raised with an inclination of one end, to allow all surplus solder to run off.

If the top or bottom seam of a round vessel is to be soldered, the angle is inserted between the plates F F, and then revolved until its entire circumference has passed through the solder.

As the solder in the pan B is diminished, more is forced in from the reservoir, by a turn of the screw D.

Where a supply-reservoir, A, is dispensed with, and the dipping-pan B' alone used, the supporting-plate or plates F''' or F' F' are lowered within the pan, to a suitable height above the solder, the proper relative distance between the plates and solder being constantly maintained by a movement of said plates, as the quantity of solder either diminishes, or is increased by a new supply.

Hence, in this invention, the depth to which a seam may be immersed into the solder-bath, is regulated in two ways—first, by the width of the slot or opening through which the seam is inserted, and, secondly, by varying the distance between the surface of the solder and the sides of said slot or opening, either by a movement of the solder to or from the opening, by means of a plunger, working in an auxiliary reservoir connected therewith, or by a movement of the plate or plates embracing the slot or opening, to or from the solder.

Slotted plates, each embracing a slot or opening of different dimensions, to suit a different size or description of vessel, may be used with the same dipping-pan, if desired.

I claim, as my invention—

1. An elongated slot or opening, formed between two bars or plates, or in a single plate, in combination with a suitable solder-pan, substantially as herein set forth.

2. The auxiliary reservoir A, provided with an opening or conduit, $b$, when combined with the solder-pan B of a soldering-apparatus, substantially as herein described.

3. The combination of the piston or plunger C with the reservoir A and solder-pan B of my improved soldering-apparatus, substantially as herein set forth.

In testimony that I claim the foregoing, I have hereunto set my hand, this 15th day of July, 1868.

E. T. COVELL.

Witnesses:
GEO. B. DOTEN,
JAMES NADDY.